United States Patent [19]
Garrett

[11] Patent Number: 5,068,649
[45] Date of Patent: Nov. 26, 1991

[54] METHOD AND APPARATUS FOR DISPLAYING DIFFERENT SHADES OF GRAY ON A LIQUID CRYSTAL DISPLAY

[75] Inventor: James H. Garrett, Spring, Tex.

[73] Assignee: Compaq Computer Corporation, Houston, Tex.

[21] Appl. No.: 258,269

[22] Filed: Oct. 14, 1988

[51] Int. Cl.$^5$ .............................................. G09G 3/18
[52] U.S. Cl. ................................... 340/793; 340/794
[58] Field of Search ...................... 340/793, 784, 703; 358/283

[56] References Cited

U.S. PATENT DOCUMENTS

| | | | |
|---|---|---|---|
| 4,531,160 | 7/1985 | Ehn | 340/793 |
| 4,808,991 | 2/1939 | Tachiuchi et al. | 340/793 |
| 4,827,255 | 5/1989 | Ishii | 340/793 |

OTHER PUBLICATIONS

Yamaha PCDC V6366 Application Manual Catalog No. LSI-2463660; 1987.

Primary Examiner—Alvin E. Oberley
Attorney, Agent, or Firm—Brumbaugh, Graves, Donohue & Raymond

[57] ABSTRACT

A method and apparatus are disclosed which provide a means for both spatially and temporally resolving the on/off states of a two-state display device such as a liquid cystal display to provide apparent shades of gray. A particular feature of this method is that the cycling between on and off states is not performed in a discernible pattern. Rather, a pseudo-random pattern is utilized which repeats only after many cycles. Additionally, when the method disclosed herein is utilized, adjacent pixels, when selected to display the same shade of gray, do not cycle on and off in synchronization, but rather utilize out-of-phase cycling patterns. This spatial resolution reduces perceived flicker in the display and provides a more stable image. In one embodiment, eight shades of gray are provided. The shades are generated by cycling individual pixels such that when averaged over time, they are: always off; on 20% of the time; 33% of the time; 40% of the time; 60% of the time; 67% of the time; 80% of the time; or, on at all times.

13 Claims, 9 Drawing Sheets

⎧  LINE 0  * * * * * . . . . . . * * *
       ⎪       1  * * * * * . . . . . . * * *
       ⎪       2  * * * * * . . . . . . * * *
PANEL  ⎨                    .
  1    ⎪                    .
       ⎪                    .
       ⎩     239  * * * * * . . . . . . * * *
       ⎧     240  * * * * * . . . . . . * * *
       ⎪                    .
PANEL  ⎨                    .
  2    ⎪                    .
       ⎪     478  * * * * * . . . . . . * * *
       ⎩     479  * * * * * . . . . . . * * *
```

```
       PIXELS
           0 1 2 3 4 5 6 7 . . . . . 639
          ─────────────────────────────
LINE 0  │  1 1 0 1 1 . . . . . . . . .

LINE 1  │  1 1 0 1 1 . . . . . . . . .
```

Fig. 2

TIMEFRAME 1:

```
           PIXELS
           0 1 2 3 4 . . . . . . . 639
           ─────────────────────────────
LINE 0   | 1 1 0 1 1 . . . . . . . . .
```

Fig. 3

TIMEFRAME 2:

```
           PIXELS
           0 1 2 3 4 . . . . . . . 639
           ─────────────────────────────
LINE 0   | 1 1 0 1 1 . . . . . . . . .
```

Fig. 4

| SHADE # | FRAMES ON | | PERCENT OF TIME ON |
|---|---|---|---|
| 1 | 0 OF 5 | (OFF) | 0% |
| 2 | 1 OF 5 | | 20% |
| 3 | 1 OF 3 | | 33% |
| 4 | 2 OF 5 | | 40% |
| 5 | 3 OF 5 | | 60% |
| 6 | 2 OF 3 | | 67% |
| 7 | 4 OF 5 | | 80% |
| 8 | 5 OF 5 | (ON) | 100% |

PIXELS

```
          0 1 2 3 4 5 6 7 8 . . . . . . . . . . .  636 637 638 639
LINE 0  | 0 0 1 0 0 1 0 0 1 . . . . . REPEAT . . 0   0   1   0
LINE 1  | 0 1 0 0 1 0 0 1 0 . . . . . PATTERN. . 0   1   0   0
LINE 2  | 1 0 0 1 0 0 1 0 0 . . . . . . . . . .  1   0   0   1
LINE 3  | 0 0 1 0 0 1 0 0 1 . . . . . . . . . . .
        | . . . . . . .
        | . . . . . . .
        | . . . . . . .
LINE 239| . . . . . . .
```

Fig. 5

4/5 SEQUENCE

| G1 | G2 | G3 | G4 | G5 |
|----|----|----|----|----|
| 11101111 | 01111011 | 11011110 | 11110111 | 10111101 |

Fig. 6

3/5 SEQUENCE

| G1 | G2 | G3 | G4 | G5 |
|----|----|----|----|----|
| 10101101 | 01101011 | 01011010 | 11010110 | 10110101 |

Fig.7

|   | 0 | 1 | 2 | 3 | 4 | .... | 78 | 79 |
|---|---|---|---|---|---|------|----|----|
| POSSIBLE ARRANGEMENTS | | | | | | | | |
| 1 | G1 | G2 | G3 | G4 | G5 | ... | G4 | G5 |
| 2 | G2 | G3 | G4 | G5 | G1 | ... | G5 | G1 |
| 3 | G3 | G4 | G5 | G1 | G2 | ... | G1 | G2 |
| 4 | G4 | G5 | G1 | G2 | G3 | ... | G2 | G3 |
| 5 | G5 | G1 | G2 | G3 | G4 | ... | G3 | G4 |

| TIMEFRAME 1: | 0 | 1 | 2 | 3 | 4 | ........ | 79 |
|---|---|---|---|---|---|----------|----|
| LINE 1 | G1 | G2 | G3 | G4 | G5 | ........ | G5 |
| LINE 2 | G5 | G1 | G2 | G3 | G4 | ........ | G4 |
| LINE 3 | G4 | G5 | G1 | G2 | G3 | ........ | G3 |

Fig.8

| TIMEFRAME 2: | 0 | 1 | 2 | 3 | 4 | .......... | 79 |
|---|---|---|---|---|---|------------|----|
| LINE 1 | G3 | G4 | G5 | G1 | G2 | ........ | G2 |
| LINE 2 | G2 | G3 | G4 | G5 | G1 | .......... | |
| LINE 3 | G1 | G2 | G3 | G4 | G5 | .......... | |

Fig. 9A

1/5 PATTERN - FRAME 1

●○○●○○○○●○○○○●○○○○●○○○○● . . . . . . . . . . . . ○○○●○○○○●○○○○
○○○○●○○○○●○○○○●○○○ . . . . . . . * * * . . * . . . . . . . . .

1/5 PATTERN - FRAME 2

○○●○○○○●○○○○●○○○○●○○○○●● . . . . . . . . . . . . . ○○●○○○○○●○○○○○
●○○○○●○○○○●○○○○●○○○○○● . . . . . . * * * . . * . . . . . . . . .

2/5 PATTERN - FRAME 1

2/5 PATTERN - FRAME 2

●●●●●●●●●●●●●●●●●●●●●●●●●○ · · · · · · ●●●●●●●●●●●
●●●●●●●●●○●●●●●●●●●●●○ · · · * * * · · ·

1/3 PATTERN - FRAME 1

●●●●●●●●●●●●●●●●●●●●●●●●● · · · · · · ●●●●●●●●●●
●●●●●●●●○●●●●●●●●●●○●●●● · · · * * * · · ·

1/3 PATTERN - FRAME 2

●●●●●●●●●●●●●●●●●●●●●●●○ · · · · · · ●●●●●●●●●●
●●●●●●○●●●●●●●●●○●●●●●● · · · * * * · · ·

1. 0 - 0
2. 0 - 1/5
3. 1/5 - 1/5
4. 1/5 - 1/3
5. 1/3 - 1/3
6. 1/3 - 2/5
7. 2/5 - 2/5
8. 1/3 - 2/3
9. 2/5 - 2/3
10. 3/5 - 3/5
11. 3/5 - 2/3
12. 2/3 - 2/3
13. 2/3 - 4/5
14. 4/5 - 4/5
15. 1 - 4/5
16. 1 - 1

METHOD AND APPARATUS FOR DISPLAYING DIFFERENT SHADES OF GRAY ON A LIQUID CRYSTAL DISPLAY

BACKGROUND OF THE INVENTION

This invention relates to electronic display panels. More particularly, it relates to display panels comprising liquid crystals and similar display systems having picture elements ("pixels") which normally are selectable in only one of two possible states (e.g., "on" or "off").

Types of Display Panels

Many different types of display panels or screens are used in electronic equipment. One particularly common type is the cathode ray tube (CRT) used in television receivers and many computer monitors. Other available display systems include those which employ incandescent filaments, light-emitting diodes ("LED's"), liquid crystal displays ("LCD's"), plasma display panels, and electroluminescent panels.

CRT's are available in both monochrome and color versions. Inasmuch as many personal computers are equipped with color monitors, much software written for such computers is designed to make use of the color capabilities of the monitor.

Color-to-Gray Translations

When such software is used on a system having only a monochrome monitor, it is customary to "translate" the colors into various "shades of gray". This term, however, does not necessarily imply that the display is colored gray. Many computer monitors employ green or amber phosphors and hence "shades of gray" actually denotes various intensity levels of those colors.

On a CRT display, various shades of gray (or intensity levels) can be generated simply by varying the intensity of the electron beam impinging on the phosphors of the screen. As this may be accomplished in analog fashion, a virtual continuum of shades of gray is available. Similarly, the intensity of an incandescent filament can be varied by changing the current passing through the filament and drive circuitry is well known which permits the current to be a continuous variable.

In contrast, other display systems employ essentially "two-state" screen dots, i.e., display elements whose intensity at an instant in time cannot normally be continuously varied, but rather are designed to be in one of two possible states e.g., "on" or "off"; "black" or "white", "light" or "dark"; "polarized" or "unpolarized"; etc.

Plainly, such display systems are ideally suited for use with digital computers which operate using the binary number system. A liquid crystal display is an example of such a system.

A problem arises in generating shades of gray on such display systems. Because such systems normally lack intermediate states, "translations" of color displays become difficult or impossible, and at least a portion of the information contained in a display intended for a color monitor is lost.

It might seem that one solution to this problem would simply be to rapidly cycle the various screen dots on and off, varying the on time so as to produce different shades of gray. If the cycling were sufficiently rapid, the alternating character would not be perceived by the human eye. In practice, however, there are at least two problems with this approach.

The first problem is that many two-state display systems, particularly LCDs, cannot be rapidly cycled. This may be due to constraints inherent in the drive circuitry and/or the intrinsic time constant of the display. For example, LCDs function by aligning liquid crystal molecules in response to an applied electric field. This alignment takes time to accomplish, and the unalignment of the molecules when the electrical signal is removed or reversed also requires an appreciable time interval.

The second problem arises when the repeat rate (the rate at which the screen display is refreshed) is relatively low, e.g., approximately 70 Hz. The problem is that when an attempt is made to assign different shades of gray to adjacent screen dots using a fixed cycling scheme, a perceptible flicker often results. It is contemplated that this flicker is due to beat frequencies between the two "shades".

SUMMARY OF THE INVENTION

The method and apparatus of the present invention provides a means for both spatially and temporally resolving the on/off states of a two-state display device such as an LCD to provide apparent shades of gray. In one embodiment, eight shades of gray are provided. These shades are generated by cycling individual screen dots such that when averaged over time, they are: always off; on 20% of the time; 33% of the time; 40% of the time; 60% of the time; 67% of the time; 80% of the time; or, on at all times.

A feature of the invention is the fact that the cycling between on and off states is not performed in a discernible pattern. For example, the shade of gray corresponding to a screen dot being on 40% of the time can be achieved by selecting the screen dot to be on for 2 cycles out of every five. However, rather than employing a pattern which repeats every five cycles (such as 10010100101001010010100101001010 . . . . . ), a pseudo-random pattern is utilized which repeats only after many cycles.

An additional feature of the method of the present invention is that adjacent screen dots, when selected to display the same shade of gray, do not cycle on and off in synchronization, but rather utilize out-of-phase cycling patterns. This spatial resolution reduces perceived flicker in the display and provides a more stable image.

BRIEF DESCRIPTION OF THE DRAWINGS

FIG. 1 shown a screen dot array of an LCD display having two LCD panels;

FIG. 2 is an illustrative representation of two consecutive lines of pixels of the LCD display having the same ON-OFF pattern;

FIG. 3 is an illustrative representation of one line of pixels of the LCD display having the same ON-OFF pattern in two consecutive timeframes;

FIG. 4 is a table of duty cycles corresponding to eight different gray-scale levels obtained by using pattern cycles of 3 and 5 and different duty cycles;

FIG. 5 is an illustrative representation of the ON-OFF pattern of the pixels of one-half of an LCD display in which each pixel is driven at a duty cycle of ⅔ in accordance with the invention;

FIG. 6 depicts exemplary basic sequences having a pattern cycle of 5 and respective duty cycles of 4/5 and 3/5 in accordance with the invention;

FIG. 7 shown exemplary arrangements of the basic sequences of FIG. 6 applied to consecutive lines of pixels of the LCD display to achieve line-to-line skewing in accordance with the invention;

FIG. 8 shown exemplary arrangements of the basic sequences of FIG. 6 applied to lines of pixels of the LCD display to achieve frame-to-frame skewing in accordance with the invention;

FIG. 9 is a pictorial representation of the pixels of an LCD display in successive frames when the pixels of the display are driven at duty cycles of 1/5, 2/5 and ⅗, respectively, using exemplary sequences to achieve line-to-line skewing and frame-to-frame skewing in accordance with the invention;

DETAILED DESCRIPTION OF SPECIFIC EMBODIMENTS

Figure 10:
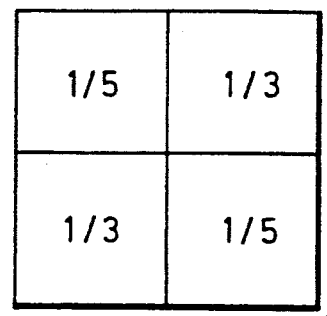
FIG. 10 contains a table of exemplary pairs of duty cycles which when respectively applied to diagonally adjacent pairs of dots in a 4-dot pixel provides sixteen shades of gray, and a schematic representation of a 4-dot pixel in which diagonally adjacent pairs of dots are driven at duty cycles of 1/5 and ⅖, respectively.

FIG. 1 shows a screen dot arrangement of an LCD panel in accordance with the invention. For convenience, the term "pixel" is used synonymously with "screen dot" except where indicated otherwise. The pixels are arranged to form a 640-column by 480-row display, which may be formed from two 640×240-pixel subpanels. The terms "rows" and "line" are used interchangeably.

Any given pixel is driven to simulate a shade of ray by driving it toward its ON state for a specified length of time, then by driving it toward its OFF state for another specified length of time. For convenience, the basic unit of time is 70th of a second.

Time-Space Guidelines

Flickering and "swimming" (an apparent instability of the picture on a display, somewhat akin to the visual image of a mirage in a desert) may be reduced in accordance with the invention by driving pixels to conform generally to two basic guidelines: (1) no two consecutive lines of pixels should display the same ON-OFF pattern, and (2) any given line of pixels should not display the same ON-OFF pattern in two consecutive timeframes.

In other words, each pixel's on-off display should be modulated both in a temporal dimension and in a spatial dimension.

These guidelines are illustrated in FIGS. 2 and 3. Assume that a 1 means that the pixel in question is ON and a 0 means the pixel is OFF. The configuration depicted in FIG. 2 does not conform to the first guideline. Likewise, the configuration depicted in FIG. 3 does not conform to the second guideline.

Pattern Cycles and Duty Cycles

Two terms are used herein for convenience. A "pattern cycle" is the repetitive period of a given pixel either in the time dimension (expressed in timeframes) or in a spatial dimension (expressed in pixels). A "duty cycle" is the number of timeframes or pixels within a pattern cycle in which the pixel is on, divided by the number of timeframes or pixels in the pattern cycle.

In the time dimension, for example, a pixel that is ON for 3 timeframes and then OFF for 2 timeframes, in a repetitive time pattern, has a pattern cycle of 5 and a duty cycle of 3/5. Pixels in a 3/5 duty cycle are sometimes referred to herein as 3/5 pixels.

FIG. 4 depicts a table of specific duty cycles for achieving eight different shades of gray utilizing two pattern cycles, namely 3 and 5, with varying duty cycles.

Shades with Pattern Cycle of 3

As noted above, to conform to the guidelines discussed above, each pixel should be modulated at a timeframe rate in both time and space. The pattern cycle of 3 is the simpler of the two cases; the set of all possible duty cycles to achieve this modulation in such a pattern cycle are 0/3, ⅓, ⅔, and 3/3.

In the 0/3 and 3/3 duty cycles, the associated pixels are always off and always on, respectively. Consequently, only the other two duty cycles need be examined.

In the spatial dimension, the other two patterns in the pattern cycle of 3 are the permutations of 001 (which is the ⅓ duty cycle) and the permutations of 110 (which is the ⅔ duty cycle).

It will be noted that these two patterns are logical inversions of each other. Therefore, only an arbitrary one of them need be discussed; the other can be generated by inverting the other.

The ⅓ duty cycle is discussed here. This duty cycle is implemented as shown in FIG. 5. The basic pattern (001) is repeated throughout an entire line.

A possibility that must be taken into account is that a run of pixels in a certain pattern will transcend a row, i.e., that a particular shade of gray, and its associated pixel pattern, will run past the end of one row into another row. This raises the possibility that two consecutive rows might share the same pixel pattern, and thus would not strictly conform to the above guidelines.

This is not a danger for the ⅓ duty cycle: since a line in the illustrative embodiment consists of 640 pixels, and 640 is not an integral multiple of 3, an Nth line of pixels will not have the same pixel pattern as an N+1th line. More particularly, a pixel pattern that begins at pixel 0 of the Nth line will repeat beginning at pixel 639 of that line and will thus be continued at pixels 0 and 1 of the next line. Consequently, the first guideline is automatically satisfied at least as to those two lines.

Note, however, that for any sequence of four or more lines 0 through 3 of the same shade of gray, lines 0 and 3 are identical. This means that each line is repeated at intervals of 3 (i.e., line 0=line 3, line 1=line 4, line 2=line 5, etc.), meaning that a three-line pattern in the same shade of gray would repeat itself. Because 240 (the number of lines on each of the two subpanels in the illustrative embodiment) is an integral multiple of 3, it is possible that the entire screen pattern could be repeated from timeframe to timeframe.

To prevent this, the pixel pattern is skewed or shifted between any two consecutive timeframes. For example, if line 0 begins with 001 in timeframe 1, it begins with 100 in timeframe2 to avoid a repeating pattern from timeframe to timeframe. This is achieved by setting the pixel (0,0) during timeframe N+1 to be equal to the setting of the pixel (239, 639) during timeframe N. Once this is done, both guidelines are satisfied.

Shapes with Pattern Cycle of 5

A pattern cycle of 5 is implemented with two basic sequences, a 4/5 sequence and a 3/5 sequence, as shown in FIG. 6. It will be noted that the 1/5 and 2/5 sequences are logical inversions of the 4/5 and 3/5 sequences, respectively. Thus, only the latter two will be discussed.

The 640 pixels in a given row are divided into 16 sets of five groups of 8 pixels each (G1 through G5) as a matter of convenience (e.g., to make hardware implementation easier). When the five groups of either sequence are put together, it will be apparent that they do indeed average out to 4/5 on and 3/5 on, respectively.

Since the groups (G1-G5) are each composed of eight bits, a horizontal line of 640 pixels will contain exactly 80 groups. Every line in a 3/5 or 4/5 sequence therefore contains one of the five possible arrangements shown in FIG. 7.

Regardless of which arrangement is used, the pattern will repeat line after line and timeframe after timeframe if left alone. This is because 5 divides evenly into both 640 (number of pixels per line) and 240 (number of lines per panel). Skewing prevents repetition of this pattern in a similar manner to that discussed above.

Line-to-line skewing is achieved as follows. If a line I begins with group N (e.g., G1 is group 1, G2 is group 2, etc.), then the next line I+1 should start with group N-1. If N-1 equals 0, then line I+1 should start with group 5.

Timeframe-to-timeframe skewing is achieved as follows. If, during a timeframe I, a given spatial pixel sequence begins with group N, then during the next timeframe I+1, that pixel sequence should start with group N+2. If N+2 is greater than 5, then during timeframe I+1 the pixel sequence should start with groupN+2-5.

An example of how these two rules are utilized is shown in FIG. 9 shows a representation of the upper left and lower right hand corners of an LCD display in each of the patterns 1/5, 2/5, and ⅜ between two successive timeframes.

Additional Advantages

The duty cycles described above advantageously reduce flickering and swimming in other ways. For example, the frequency beating between pixels is reduced. Furthermore, the duty cycles reduce the chance of generating a net DC bias across a pixel (which could damage the pixel).

Low-Resolution Cross-Hatching

Conventionally, screen displays are commonly classified as high resolution and low resolution. In high resolution, each pixel is typically composed of one screen dot; in low resolution, each pixel is composed of more than one dot, e.g., a 3×3 dot pattern. The greater number of dots per pixel in low resolution increases the available granularity of gray shading.

In accordance with the invention, using a 2×2 dot pattern as a pixel allows cross-hatching in the conventional manner to produce 16 shades of gray instead of eight. For example, cross-hatching can be used in low resolution to produce a pixel that is darker than a 0 pixel but lighter than a 1/5 pixel. A similar operation can be used to obtain a gray shade between the 1/5 and ⅜ pixels.

FIG. 10 sets forth a table of duty cycles that may be used in generating 16 shades of gray. Also shown in FIG. 10 is a quartered box representing a 4-dot pixel, each quarter representing a screen dot. In each quarter of the box, a number is shown that represents the duty cycle for that box for a particular shade of gray, in this case the shade designated by number 4 in the table of FIG. 10.

Apparatus

Figure 11:
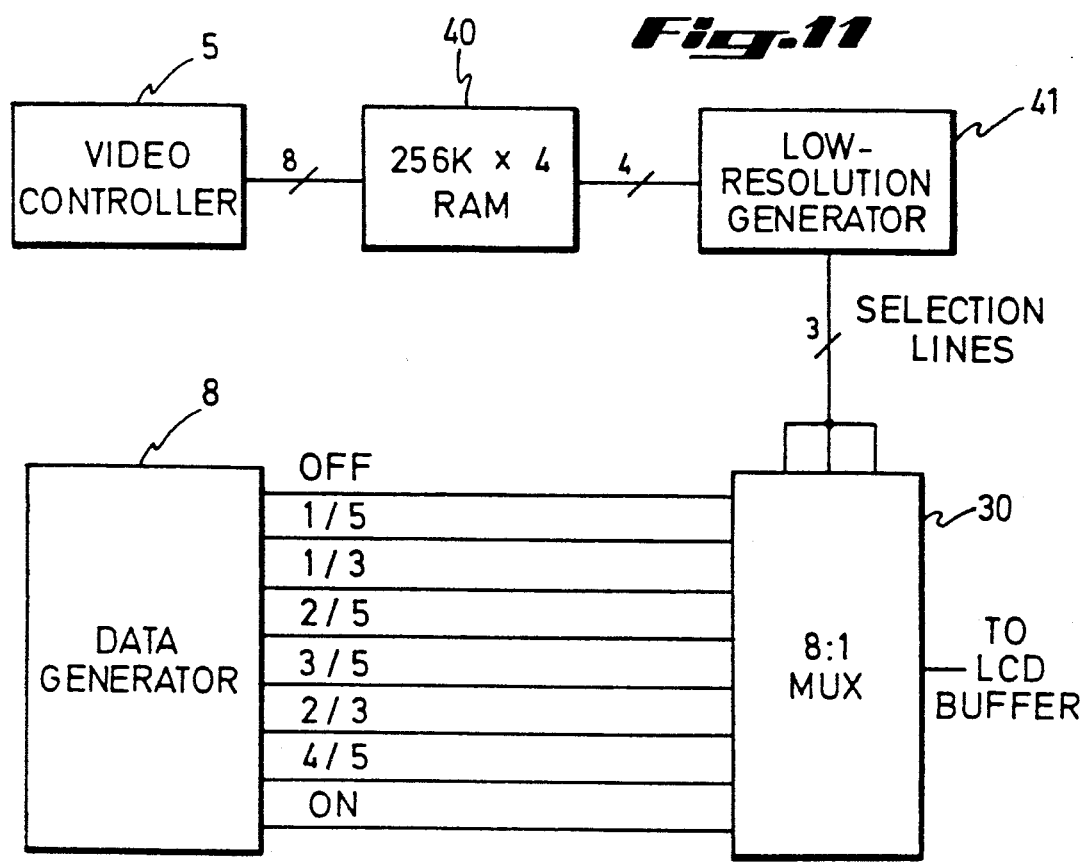
FIG. 11 is a functional block diagram of an exemplary display control system in accordance with the invention.

A high-level diagram of apparatus capable of implementing the method of the invention is shown in FIG. 11. A conventional video controller 5 outputs an 5-bit string that specifies which color (out of a possible 256) is desired for display. The 8-bit string is mapped to a 4-bit string by the contents of the RAM 40 and provided to a Low-Resolution Generator 41. The Low-Resolution Generator 41 is turn provides a 3-bit selection signal to an 8:1 Multiplexer 30 which selects one of the dc voltage levels corresponding to the ON or OFF state, or a bit of one of the digital signals provided by the Data Generator 8 for the current screen dot of the LC display being addressed by the video controller 5.

Data Generator

Figure 12:
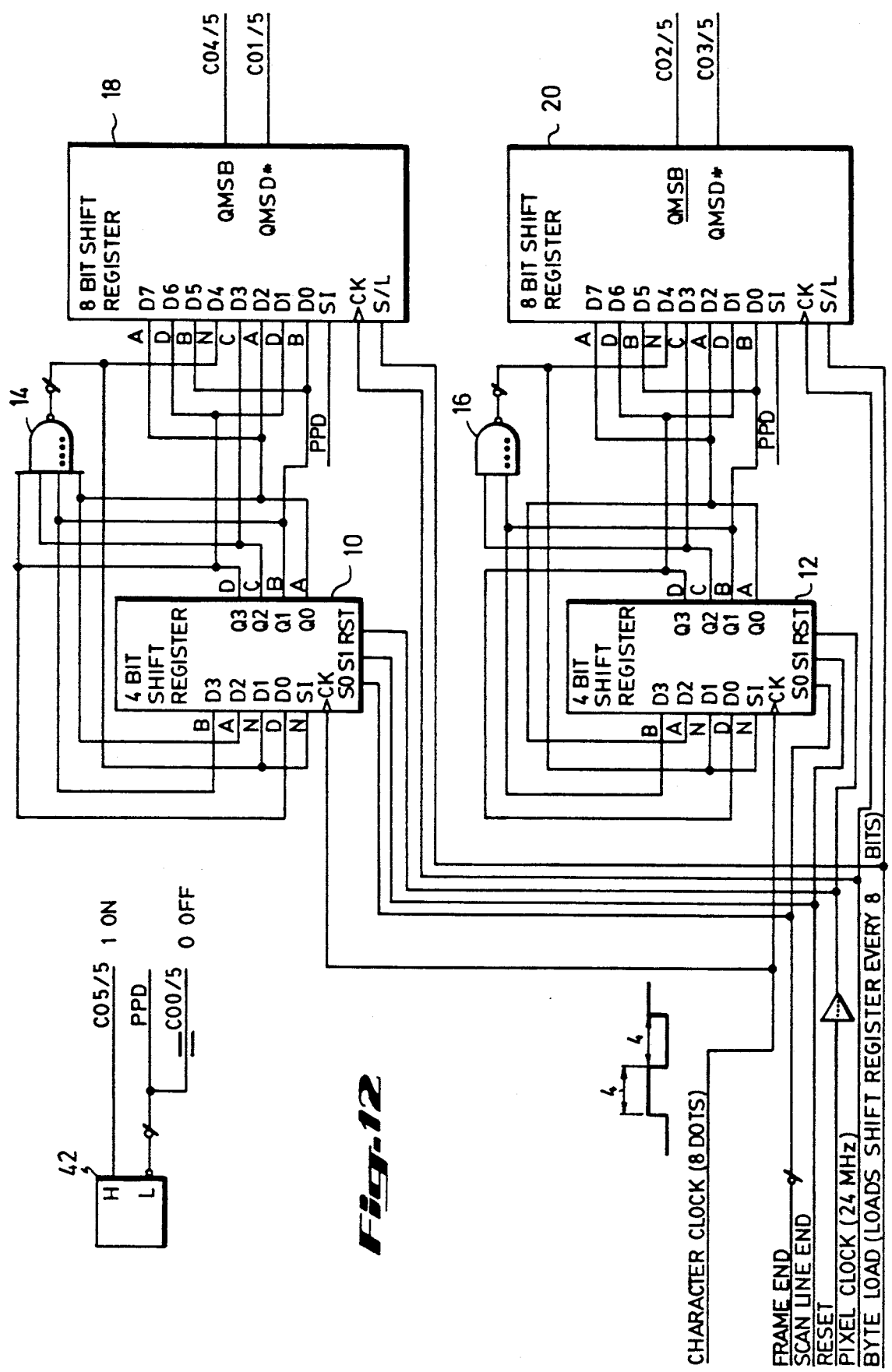
FIG. 12 is a schematic circuit diagram of a portion of the data generator of the display control system of FIG. 11 for generating dc voltage levels corresponding to the ON state and the OFF state of a screen dot of the LCD display, and digital signals having pattern cycle of 5, duty cycles of 1/5, 2/5, 3/5 and 4/5 and respective bit patterns in accordance with the invention.
Figure 13:
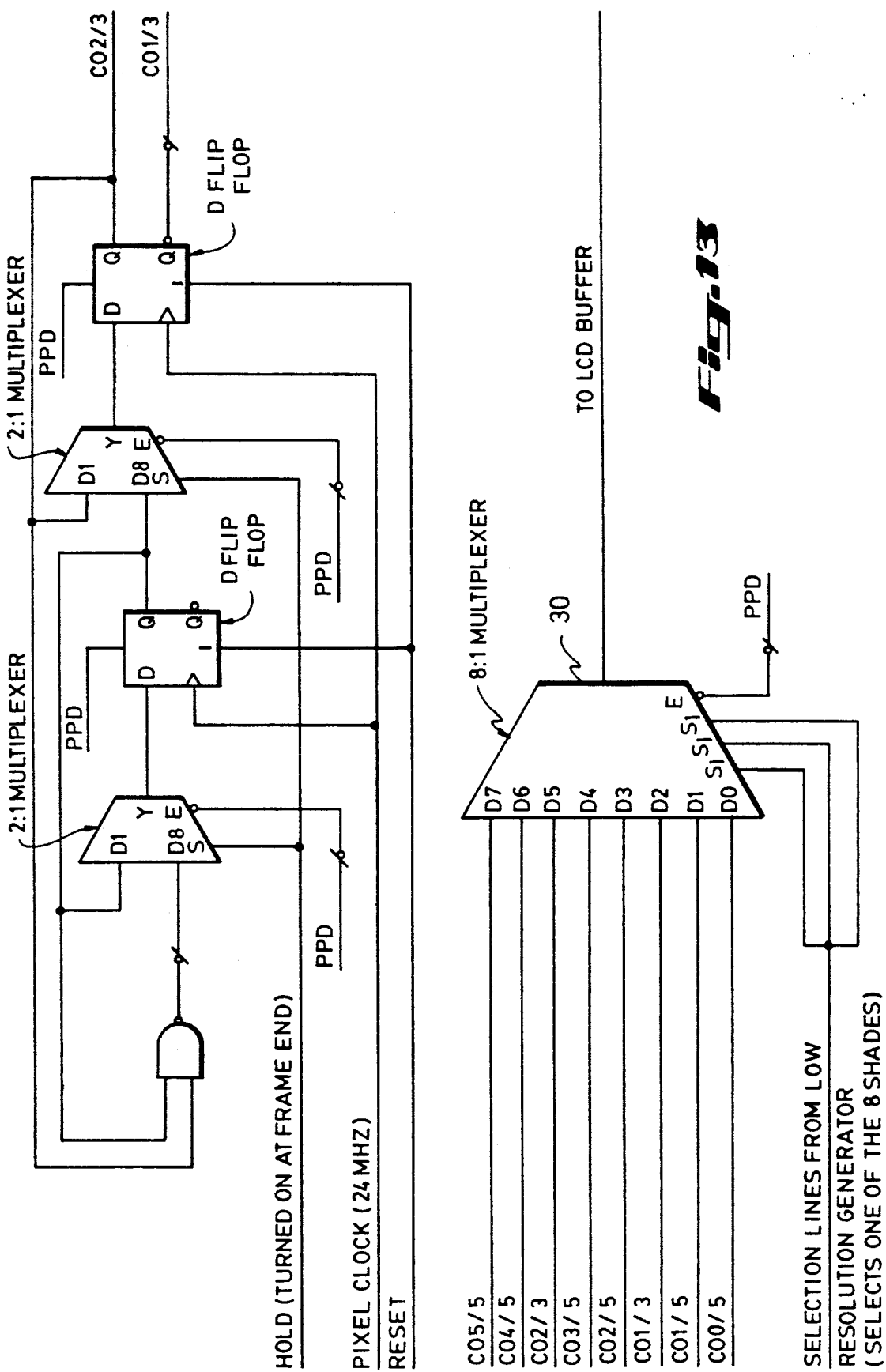
FIG. 13 are schematic circuit diagrams of portions of the data generator of the display control system of FIG. 11 for concurrently generating digital signals having a pattern cycle of 3, duty cycles of ⅓ and ⅔ and respective bit patterns in accordance with the invention, and the Multiplexer of the display control system of FIG. 11 for selecting one of the dc voltage levels corresponding to the ON or OFF state, or an appropriate bit of one of the digital signals provided by the data generator for a respective screen dot of the LCD display.

A schematic of an illustrative data generator system 8 is depicted in FIGS. 12 and 13. Referring to FIG. 12, two 4-bit shift registers 10 and pb 12 and corresponding AND gates 14 and 16 operate to generate and rotate the patterns in which screen dots are turned ON and OFF.

The data generator system's normal mode of operation is to rotate the display pattern, with two exceptions. In the case of an end-of-line signal, shown in the FIG. as scanline end, the system performs a hold or non-rotate operation, so that the next display pattern generated is the same as the last display pattern generated before the end-of-line signal. In the case of an end-of-screen signal, shown in the Figure as frame end (e.g., a vertical sync signal that in the illustrative embodiment occurs after 2450 LCD lines), the data generator system self-loads with the proper bit values so that the pattern will be skewed from timeframe to timeframe.

The 8 bit shift registers 18 and 20 in FIG. 12 operate to temporarily store the rotated or skewed patterns and send them, one bit at a time, to the 2:1 multiplexer 30 shown in FIG. 13. The portion of the data generator system 8 shown in FIG. 12 provide all of the shades that have a pattern cycle of 5 (i.e., 0, 1/5, 2/5, 3/5, 4/5, 5/5).

The shades of gray that have le of three (⅓ ⅔) are provided by the circuitry shown in the top half of FIG.

13. This configuration simply rotates the three bit pattern once every cycle. When vertical sync occurs, a hold or non-rotate is performed. The horizontal sync signal need not be considered in this case because line to line skewing is not necessary in the shades that have a pattern cycle of 3.

When all 8 shades (0, 1/5 ... 4/5, 1) are available, they are passed on to the 8:1 multiplexer 30, as shown in FIGS. 11 and 13. The three control lines of the multiplexer then choose one of the eight shades of gray and send it to the LCD panel to be displayed.

Even in low resolution mode, this shading only provides a maximum of 16 different shades. Therefore, the eight bit string will be used to determine which of the 16 cross-hatched shades is desired.

Cross-hatching is actually performed within the low resolution generator. However, if high resolution is desired, then these four bits must pass through the low resolution generator and be further reduced to 3 bits (8 choices). Once this is done, these bits pass on to the multiplexer and one of the eight high resolution shades is chosen and sent to the LCD panel to be displayed.

It will be recognized by those of ordinary skill having the benefit of this disclosure that the embodiments described here are presented for the purpose of illustrating, and not of limiting, the invention defined by the claims set forth below.

What is claimed is:

1. A display control system for producing an optical gray-scale image on a display device having an array of display elements each providing a first or a second optical state in response to a first or a second signal level, respectively, th array of display elements having a plurality of rows and a plurality of columns, the system comprising:

means for generating respective display signals for the display elements for producing a gray-scale image of a specified color, the display signals comprising digital signals each having a pattern of bits respectively corresponding to the first or the second signal level, a predefined pattern cycle and a duty cycle related to the optical gray-scale of the image at the position of the respective display element, the pattern of bits of each one of the digital signals being repetitively generated, the means for generating display signals providing successive bits of the display signals for respective diaplay elements in successive timeframes, in each timeframe one bit of each of the display signals being provided in sequence for consecutive display elements in each row from a first to a last display element of the row and for consecutive rows beginning at a first row and ending at a last row of the array, and causing a predetermined skewing of each subsequently generated display signal having a pattern cycle for which the total number of display elements in a row is integrally divisible each time a bit of a respective display signal is provided for the last display element of a row, and causing a predetermined skewing of each subsequently generated display signal having a pattern cycle for which the total number of display elements in the array is integrally divisible each time a bit f a respective display signal is provided for the last display element of the last row of the array.

2. The display control system of claim 1, wherein the display device is a liquid crystal display (LCD) panel and the array of display elements comprises an array of screen dots of the LCD panel.

3. The display control system of claim 1, wherein the means for generating the display signals for the display elements includes:

means for concurrently generating a plurality of serial digital signals each having a pattern of bits respectively corresponding to the first or the second signal levels, a predefined pattern cycle and a different duty cycle;

means for generating the first and the second signal levels;

display control means for providing address data for sequentially addressing consecutive display elements in consecutive rows of the array in each timeframe from the first display element of the first row to the last display element of the last row, color attribute data associated with each display element being addressed, an end-of-row signal when address data for addressing the last display element of a row is provided, and an end-of-frame signal when address data for addressing the last display element of the last row is provided; and display signal selection means responsive to the address data and the color attribute data for selecting the first or the second signal level, or a respective bit of one of the plurality of serial digital signals having a duty cycle related to the optical gray-scale of the image at the position of the display element being addressed, and wherein the means for generating the plurality of serial digital signals is responsive to the end-of-row signal for skewing by a predetermined number of bit positions each subsequently generated digital signal having a pattern cycle for which the number of display elements of a row is integrally divisible, and is further responsive to the end-of-frame signal for skewing by a predetermined number of bit positions each subsequently generated digital signal having a pattern cycle for which the total number of display elements of the array is integrally divisible.

4. The display control system of claim 3, wherein the means for generating a plurality of serial digital signals includes respective feedback shift register means for generating each pair of serial digital signals having the same pattern cycle and complementary patterns of bits.

5. The display control system of claim 1, wherein the optical gray-scale image produced on the display device is composed of an array of pixels each consisting of a respective one of the display elements, the image having eight gray-scale levels and each one of the display signals having a pattern cycle of 3 or 5 and a duty cycle of ⅓ or ⅔ or 1/5, 2/5, 3/5 or 4/5, respectively, or a duty cycle of 0 or 1, where the duty cycle of 0 corresponds to the first optical state and the duty cycle of 1 corresponds to the second optical state.

6. The display control system of claim 1, wherein the optical gray-scale image produced on the display device is composed of an array of pixels each consisting of a separate group of display elements in consecutive rows and consecutive columns, and a respective optical gray-scale level is obtained for each one of the pixels by cross-hatching of the display elements of the pixel by providing respective display signals therefor.

7. The display control system of claim 6, wherein each pixel of the optical gray-scale image produced on the display device consists of a respective group of four mutually adjacent display elements, including two pairs of diagonally adjacent display elements, the image having sixteen gray-scale levels, each one of the display signals having a pattern cycle of 3 or 5 and a duty cycle of ⅓ or ⅔, or 1/5, 2/5, 3/5 or 4/5, respectively, or a duty cycle of 0 or 1, the display control system generating a respective pair of display signals having the same duty cycle for each diagonally adjacent pair of display elements of a pixel, and the duty cycles of the respective pairs of display signals for the two diagonally adjacent pairs of display elements of each pixel being 0–0, 0–1/5, 1/5-1/5, 1/5-⅓, 166 –166, 166-2/5, 2/5-2/5, ⅓-170, 2/5-⅔, 3/5-3/5, 3/5-⅔, ⅔-⅔, ⅔-4/5, 4/5-4/5, 1-4/5 or 1-1, where the duty cycle of 0 corresponds to the first optical state and the duty cycle of 1 corresponds to the second optical state.

8. A method for driving a display device having a multiplicity of display elements each providing a first or a second optical state in response to a first or a second signal level, respectively, to produce an optical gray-scale image, the display elements being disposed in an array having a plurality of rows and a plurality of columns, the method comprising the steps of:

generating respective display signals for the display elements for producing a gray-scale image of a specified color, the display signals comprising digital signals each having a pattern of bits respectively corresponding to the first or the second signal level and having a predefined pattern cycle and a duty cycle related to the optical gray-scale of the image at the position of the respective display element, the pattern of this of each one of the digital signals being repetitively generated;

providing successive bits of the display signals for the display elements in successive timeframes, in each timeframe on bit of each of the display signals being provided in sequence for consecutive display elements in each row from a first to a last display element of the row, and for consecutive rows beginning at a first row and ending at a last row of the array;

causing a predetermined skewing of each subsequently generated display signal having a pattern cycle for which the total number of display elements in a row is integrally divisible each time a bit of a respective display signal is provided for the last display element of a row; and causing a predetermined skewing of each subsequently generated display signal having a pattern cycle for which the total number of display elements in the array is integrally divisible each time a bit of a respective display signal is provided for the last display element of the last row of the array, whereby in successive timeframes adjacent display elements in each row of the array are provided with different sequences of the first and the second signal levels, and adjacent display elements in each column of the array are provided with different sequences of the first and the second signal levels.

9. The method for driving a display device of claim 8, wherein the display device is a liquid crystal display (LCD) panel and the multiplicity of display elements is a multiplicity of screen dots of the LCD panel.

10. The method for driving a display device according to claim 8, wherein the step of generating the first and the second signal levels, and concurrently generating a plurality of serial digital signals each having a pattern of bits respectively corresponding to the first or the second signal levels, a predefined pattern cycle, nd a different duty cycle; and the step f providing successive bit of the display signals for the display elements in successive timeframes includes the steps of: generating address data for sequentially addressing consecutive display elements in consecutive rows of the array in each timeframe from the first display element of the first row to the last display element of the last row, generating color attribute data associated with each display element being addressed, generating an end-of-row signal when address data for addressing the last display element of a row is generated, generating an end-of-frame signal when address data for addressing the last display element of the last row is generated, and selecting the first or the second signal level, or a respective bit of one of the plurality of serial digital signals having a duty cycle representative of the optical gray-scale of the image at the position of the display element being addressed; and wherein each subsequently generated digital signal having a pattern cycle for which the number of display elements of a row is integrally divisible is skewed by a predetermined number of bit positions each time the end-of-row signal is generated, and each subsequently generated digital signal having a pattern cycle for which the total number of display elements of the array is integrally divisible is skewed by a predetermined number of bit positions each time the end-of-frame signal is generated.

11. The method for driving a display device according to claim , wherein the optical gray-scale image produced on the display device is composed of an array of pixels each consisting of a respective one of the display elements, the image having eight gray-scale levels and each one of the display signals having a pattern cycle of 3 r 5 and a duty cycle of ⅓ or ⅔, or 1/5, 2/5 or 4/5, respectively, or a duty cycle of 0 or 1, where the duty cycle of 0 corresponds to the first optical state and the duty cycle of 1 corresponds to the second optical state.

12. The method for driving a display device according to claim 8, wherein the topical gray-scale image produced on the display device is composed of an array of pixels each consisting of a separate group of display elements in consecutive rows and consecutive columns, and a respective gray-scale level is obtained for each one of the pixels by cross-hatching of the display elements of the pixel by providing respective display signals therefor.

13. The method for driving a display device according to claim 12, wherein each pixel of the optical gray-scale image produced on the display device consists of a respective group of four mutually adjacent display elements, including two pairs of diagonally adjacent display elements, the image having sixteen gray-scale levels, each one of the display signals having a pattern cycle of 3 or 5 and a duty cycle of ⅓ or ⅔, or 1/5, 2/5, 3/5 or 4/5. respectively, or a duty cycle or 0 or 1, the display control; system generating a respective pair of display signals having the same duty cycle for each diagonally adjacent pair of display elements of a pixel, and the duty cycles of the respective pairs of display signals for the two diagonally adjacent pairs of display elements of each pixel being 0–0, 0–1/5, 1/5-1/5, 1/5-⅓, ⅓-⅓, ⅓-2/5, ⅓-⅔, 2/5-⅔, 3/5-3/5, 3/5-⅔, ⅔-⅔, ⅔-4/5, 4/5-4/5, 1-4/5 or 1-1, where the duty cycle of 0 corresponds to the first optical state and the duty cycle of 1 corresponds to the second optical state.

* * * * *

UNITED STATES PATENT AND TRADEMARK OFFICE
CERTIFICATE OF CORRECTION

PATENT NO. : 5,068,649

DATED : November 26, 1991

INVENTOR(S) : James H. Garrett

It is certified that error appears in the above-identified patent and that said Letters Patent is hereby corrected as shown below:

Col. 3, line 9, "Fig. 9 is a pictorial representation of the pixels of an LCD display in successive frames when the pixels of the display are driven at duty cycles of 1/5, 2/5 and 2/3, respectively, using exemplary sequences to achieve line-to-line skewing and frame-to-frame skewing in accordance with the invention;" should read -- Figs. 9A and 9B are pictorial representations of the pixels of an LCD display in successive frames when the pixels of the display are driven at duty cycles of 1/5, 2/5 and 1/3, respectively, using exemplary sequences to achieve line-to-line skewing and frame-to-frame skewing in accordance with the invention; --

UNITED STATES PATENT AND TRADEMARK OFFICE
CERTIFICATE OF CORRECTION

PATENT NO. : 5,068,649

DATED : November 26, 1991

INVENTOR(S) : James H. Garrett

It is certified that error appears in the above-identified patent and that said Letters Patent is hereby corrected as shown below:

Col. 3, line 20, "2/3" should read -- 1/3 --; line 28, "having" should read -- having a --; line 53, "ray" should read -- gray --; line 57, "is 70th" should read -- is referred to here as a "timeframe," which may be approximately 1/70th --. Col. 5, line 18, "Shapes" should read --Shades --; line 57, "FIG. 9 shows a representation" should read -- Fig. 8. Figs. 9A and 9B show a representation --. Col. 6, line 30, "5-bit" should read -- 8-bit --; line 39, "LC" should read -- LCD --; line 45, "pb 12" should read -- 12 --; line 63, "2:1" should read -- 8:1 --; line 65, "provide" should read -- provides --; line 67, "le of three ($\frac{1}{3}$ $\frac{2}{3}$) " should read -- a pattern cycle of three (1/3, 2/3) --. Col. 7, line 34, "th array" should read -- the array --; lines 57 and 62, each occurrence, "for which" should read -- by which --; line 64, "bit f a" should read -- bit of a --. Col. 8, lines 35 and 40, each occurrence, "for which" should read -- by which --.

UNITED STATES PATENT AND TRADEMARK OFFICE
CERTIFICATE OF CORRECTION

PATENT NO. : 5,068,649
DATED : November 26, 1991
INVENTOR(S) : James H. Garrett

It is certified that error appears in the above-identified patent and that said Letters Patent is hereby corrected as shown below:

Col. 9, line 11, "166-166, 166-2/5, 2/5-2/5, 1/3-170," should read -- 1/3-1/3, 1/3-2/5, 2/5-2/5, 1/3-2/3, --; line 31, "this" should read -- bits --; line 35, "on bit" should read -- one bit --; lines 43 and 49, each occurrence, "for which" should read -- by which --; line 64, "generating" should read -- generating respective display signals includes the steps of generating --. Col. 10, lines 2-3, "f providing successive bit" should read -- of providing successive bits --; lines 20 and 25, each occurrence, "for which" should read -- by which --; line 30, "claim," should read -- claim 8 --; line 35, "3 r 5 and a duty cycle of 5/8 or 2/3," should read -- 3 or 5 and a duty cycle of 1/3 or 2/3, --; line 40, "topical" should read -- optical --; line 56, "cycle or" should read -- cycle of --; line 63, "1/3-2/5," should read -- 1/3-2/5, 2/5-2/5, --.

Signed and Sealed this

Twenty-ninth Day of June, 1993

Attest:

MICHAEL K. KIRK

Attesting Officer

Acting Commissioner of Patents and Trademarks